(12) United States Patent
Belitsch (10) Patent No.: US 10,613,009 B2
(45) Date of Patent: Apr. 7, 2020

(54) VISCOMETER FOR DETERMINING DYNAMIC AND KINEMATIC VISCOSITIES

(71) Applicant: Wolfgang Belitsch, Hart (AT)

(72) Inventor: Wolfgang Belitsch, Hart (AT)

( * ) Notice: Subject to any disclaimer, the term of this patent is extended or adjusted under 35 U.S.C. 154(b) by 337 days.

(21) Appl. No.: 15/867,192

(22) Filed: Jan. 10, 2018

(65) Prior Publication Data
US 2018/0195943 A1    Jul. 12, 2018

(30) Foreign Application Priority Data

Jan. 12, 2017 (AT) .............................. A 50014/2017

(51) Int. Cl.
*G01N 11/08* (2006.01)
*G01N 11/04* (2006.01)

(52) U.S. Cl.
CPC .............. *G01N 11/08* (2013.01); *G01N 11/04* (2013.01)

(58) Field of Classification Search
CPC ................................. G01N 11/08; G01N 11/04
See application file for complete search history.

(56) References Cited

U.S. PATENT DOCUMENTS

| 8,413,488 B2 | 4/2013 | Belitsch | |
| 2009/0216465 A1* | 8/2009 | Millet | B01L 3/0217 702/50 |

(Continued)

FOREIGN PATENT DOCUMENTS

AT        508 276 B1      1/2011

OTHER PUBLICATIONS

Ali Ostadfar, "Biofluid Mechanics Principles and Applications; Chapter 1 Fluid Mechanics and Biofluids Principles", 2016 pp. 31-32 (Year: 2016).*

*Primary Examiner* — Regis J Betsch
(74) *Attorney, Agent, or Firm* — Merchant & Gould P.C.

(57) ABSTRACT

In a measuring method for measuring the viscosity of an essentially non-compressible measuring medium (F) with a measuring device (1) comprising a first container (2), wherein the measuring medium (F) can leak from the first container (2) via a capillary (11) which, in an operating position, is arranged at a certain capillary angle ($\alpha$) toward the horizontal, preferably perpendicularly, via an outlet opening (13) of the capillary (11), the measuring medium (F) is introduced, in a first process step, into the first container (2) filled with a compressible medium, in particular ambient air (L), whereupon the measuring medium (F) occupies a partial volume ($V_{F0}$) of the total volume ($V_0$) of the first container (2), wherein, in a second process step, a first pressure difference ($\Delta p_1$), which is kept constant, and, respectively, a second pressure difference ($\Delta p_2$), which is kept constant, or a pressure difference $\Delta p(t)$, which decreases over time, are adjusted between a pressure ($p_1$ or, respectively, $p_2$; $p(t)$) of the compressible medium (L) in the first container (2) and a pressure ($p_0$) of the compressible medium (L) at the outlet opening (13) of the capillary (11), wherein, in a third process step, the decrease in volume ($dV_F(t)/dt$) of the measuring medium (F) per time unit is determined for the first pressure difference ($\Delta p_1$), which is kept constant, and the second pressure difference ($\Delta p_2$), which is kept constant, or for a first pressure difference ($\Delta p(t)$), which decreases as a result of the decrease in volume ($dV_F(t)/dt$) of the measuring medium (F), in order to determine at least two measurement points of the decrease in volume ($dV_F(t)/dt$) of the measuring medium (F) per time unit over the pressure difference ($\Delta p$) as a resulting straight line (14) in a coordinate system, wherein, in a final process step, the kinematic viscosity ($v$) is determined from the value (15) of the resulting straight line (14) for the decrease in volume ($dV_F(t)/dt$) of the measuring medium (F) per time (Continued)

unit at the pressure difference of $\Delta p=0$ and the dynamic viscosity ($\eta$) of the measuring medium (F) is determined from the slope of the resulting straight line (14).

3 Claims, 4 Drawing Sheets

(56) References Cited

U.S. PATENT DOCUMENTS

2011/0126614 A1\* 6/2011 Belitsch ................ G01N 11/04
                                                      73/54.04
2016/0076986 A1  3/2016 Belitsch et al.

\* cited by examiner

VISCOMETER FOR DETERMINING DYNAMIC AND KINEMATIC VISCOSITIES

This application claims benefit of Serial No. A 50014/2017, filed 12 Jan. 2017 in Austria and which application is incorporated herein by reference. To the extent appropriate, a claim of priority is made to each of the above disclosed applications.

BACKGROUND OF THE INVENTION

The invention relates to a measuring method for measuring the viscosity of an essentially non-compressible measuring medium with a measuring device comprising a first container, wherein the measuring medium can leak from the first container via a capillary and via an outlet opening of the capillary.

Such a measuring method and such a measuring device are known from document AT 508 276 B1. In the measuring method disclosed in this document, the following process steps are performed for measuring the dynamic viscosity $\eta$ as a physical quantity of an essentially non-compressible liquid measuring medium:
in a first process step, the measuring medium is introduced into a container filled with a compressible medium, whereupon the measuring medium occupies a partial volume of the total volume of the container and, wherein
in a second process step, an initial pressure of the compressible medium is measured and, wherein
in a third process step, the total volume of the container is changed by a predetermined changing volume $\Delta V$ and, wherein
in a fourth process step, a changing internal pressure of the compressible medium caused by the change in volume is measured in the container and, wherein
in a fifth process step, the liquid measuring medium flows through at least one opening in the container through a capillary, wherein the changing internal pressure is measured at at least one measurement time and wherein, in the second process step, the initial pressure of the compressible medium surrounding the liquid measuring medium after the discharge from the capillary is measured, wherein the measurement of the dynamic viscosity $\eta$ of the liquid measuring medium is carried out by evaluating the measured data by means of the Hagen-Poiseuille law.

Accordingly, in the measuring method according to patent AT 508 276 B1, the time $\Delta t$ is measured which is required by a certain partial volume $\Delta V_F$ of the measuring medium for flowing through the capillary in order to determine therefrom the dynamic viscosity $\eta$ via the equation $$\eta = \Delta t \cdot R_K^4 \cdot \pi \cdot \Delta p / (8 \cdot L_K \cdot \Delta V_F)$$

obtained by transforming the Hagen-Poiseuille law $$\Delta V_F / \Delta t = +\pi \cdot R_K^4 \cdot \Delta p / (8 \cdot L_K \cdot \eta).$$

As per the measuring method according to patent AT 508 276 B1, two measuring operations are necessary for determining the kinematic viscosity $\nu$, wherein, from the combination of the equation $$(\Delta V_F/\Delta t)_{v,u} = +\pi \cdot D_K^4 \cdot |\Delta p|/(128 \cdot L_K \cdot \eta) + \pi \cdot D_K^4 \cdot (\rho \cdot g \cdot h) \cdot \sin(\alpha)/(128 \cdot L_K \cdot \eta)$$

for the measuring medium pressed downward with the equation $$(\Delta V_F/\Delta t)_{v,o} = -\pi \cdot D_K^4 \cdot |\Delta p|/(128 \cdot L_K \cdot \eta) + \pi \cdot D_K^4 \cdot (\rho \cdot g \cdot h) \cdot \sin(\alpha)/(128 \cdot L_K \cdot \eta)$$

for the measuring medium sucked upward, the equation $$(\Delta V_F/\Delta t)_{v,u} - (\Delta V_F/\Delta t)_{v,o} = 2 \cdot \pi \cdot D_K^4 \cdot \Delta p/(128 \cdot L_K \cdot \eta)$$

for determining the dynamic viscosity and the equation $$(\Delta V_F/\Delta t)_{v,u} + (\Delta V_F/\Delta t)_{v,o} = 2 \cdot \pi \cdot D_K^4 \cdot (\rho \cdot g \cdot h) \sin(\alpha)/(128 \cdot L_K \cdot \eta)$$

for determining the density are obtained, and by means of the equation $$\nu = \eta/\rho$$

the kinematic viscosity $\nu$ is obtained.

It has turned out to be a disadvantage of the known measuring method and the known measuring device that the measuring apparatus with the capillary arranged horizontally for measuring the dynamic viscosity must be set up horizontally with great precision so as not to obtain any measuring errors. Indeed, the dynamic viscosity is ascertained by adjusting a pressure difference at a capillary lying horizontally, whereas the kinematic viscosity is ascertained by determining the volume flow caused by gravity in a vertically positioned capillary. Hence, if the known measuring apparatus is not set up precisely horizontally, the capillary will also not be located precisely horizontally, for which reason a portion of the kinematic viscosity will be measured along with the determination of the dynamic viscosity, resulting in a measuring error.

In the known measuring apparatus, it has furthermore turned out to be detrimental to the measurement of the kinematic viscosity that
1. two consecutive measurements are necessary, which causes the measurement time to double and therefore also increases the total error of the measurement,
2. $\Delta p$ must be constant and of exactly the same size in the two process steps "pressing" and "sucking", but must have opposite signs, which cannot reasonably be accomplished especially in the method with a $\Delta p$ changing over time,
3. depending on the design of the measuring cell, "pressing" or "sucking" would be more convenient for the measurement, however, in the present method, both process steps must be employed for measuring the kinematic viscosity.

SUMMARY OF THE INVENTION

It is the object of the invention to provide a measuring method according to the type as indicated in the first paragraph, wherein the kinematic viscosity and the dynamic viscosity can be determined simultaneously with a capillary in a single measurement, thereby also increasing the measuring accuracy.

For achieving the above-mentioned object, in such a measuring method involving a measuring device comprising a capillary which, in an operating position, is arranged at a certain capillary angle toward the horizontal, preferably perpendicularly, it is envisaged that, in a first process step, the measuring medium is introduced into the first container filled with a compressible medium, in particular ambient air, whereupon the measuring medium occupies a partial volume of the total volume of the first container, and wherein, in a second process step, a pressure difference between a pressure of the compressible medium in the first container and a pressure of the compressible medium at the outlet opening of the capillary is adjusted, and wherein, in a third process step, the decrease in volume of the measuring medium per time unit is determined for the pressure difference which is kept constant or for a pressure difference which decreases as a result of the decrease in volume of the measuring medium in order to determine at least two measurement points of the decrease in volume of the measuring medium per time unit over the pressure difference as a resulting straight line in a coordinate system, and wherein, in a final process step, the kinematic viscosity is determined from the value of the resulting straight line for the decrease in volume of the measuring medium per time unit at the pressure difference of $\Delta p=0$ and the dynamic viscosity of the measuring medium is determined from the slope of the resulting straight line.

The invention is based on the finding that the volume flow of the measuring medium per time unit produces a resulting straight line in a coordinate system with a constant or decreasing pressure difference at the two ends of the capillary across two or more measurements points. Furthermore, a plurality of tests and measurements have permitted the realization according to the invention that the kinematic viscosity at the pressure difference of $\Delta p=0$ can be determined from the value of the resulting straight line for the decrease in volume of the measuring medium per time unit and that the dynamic viscosity of the measuring medium can be determined from the slope of the resulting straight line by inclusion into a formula.

Due to the features according to the invention, it is achieved that, with only one measuring method and only one measuring apparatus, both the dynamic viscosity and the kinematic viscosity can be measured simultaneously in one measurement. In this connection, it is particularly advantageous that the measuring medium has to be introduced into the measuring apparatus only once and, after the execution of the measuring method, both the dynamic and the kinematic viscosities can be indicated.

Furthermore, it has turned out to be advantageous that the measuring method works not only for a capillary arranged horizontally or vertically in a measuring apparatus, but, as a matter of principle, can be used with any capillary angle toward the horizontal, since, in this measuring method for calculating the dynamic viscosity, the capillary angle has no impact and is included in constant $K_2$ into the formula for calculating the kinematic viscosity and can be factored into the measurement of the capillary angle with position sensors.

BRIEF DESCRIPTION OF THE DRAWINGS

The invention is described in the following based on an exemplary embodiment as illustrated in the figures, to which the invention is not limited, however.

DETAILED DESCRIPTION OF THE PREFERRED EMBODIMENTS

Figure 1:
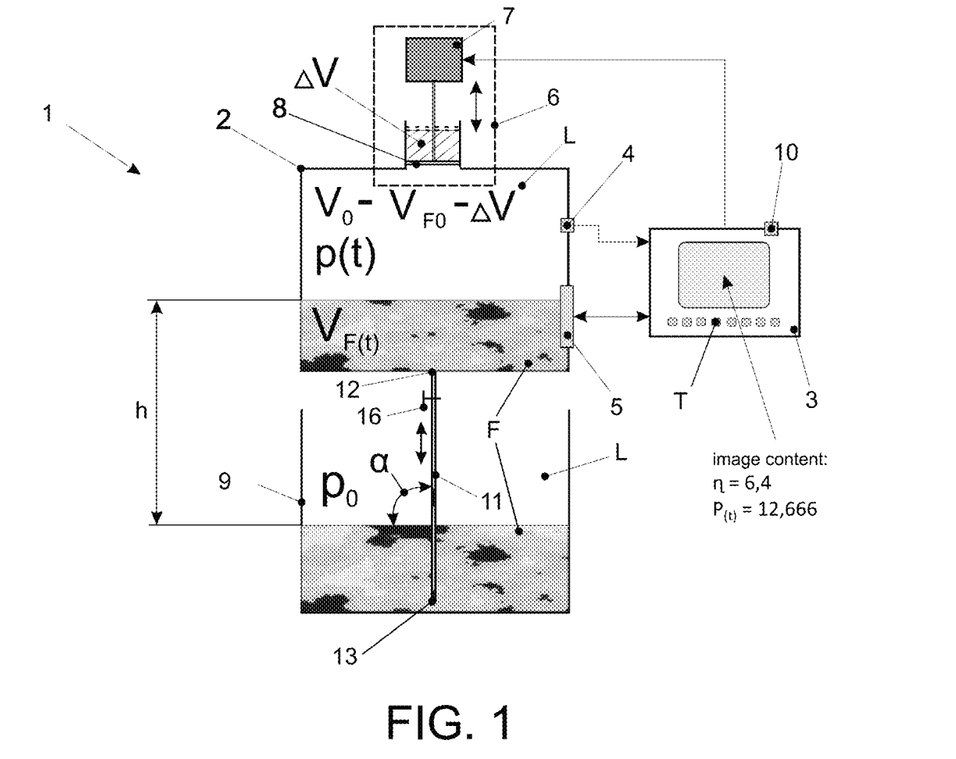
FIG. 1 shows a measuring device with a vertical capillary for measuring the kinematic and dynamic viscosities.

FIG. 1 shows a measuring device 1 according to a first exemplary embodiment of the invention for measuring the kinematic and dynamic viscosities of an essentially non-compressible measuring medium, which is formed by a fluid F. The measuring device 1 comprises a first container 2 with a volume $V_0$ in which a pressure $p_0$ prevails if the container 2 is empty. In this connection, "empty" is understood to mean that the fluid F to be measured has not yet been introduced into the first container 2, whereas the first container 2, however, is filled with a compressible medium, in this exemplary embodiment with ambient air or, respectively, air L. A computer 3 constitutes an evaluation device which is connected to a pressure sensor 4 in order to measure the pressure p(t) prevailing in the first container 2 during the various process steps of the measuring method. Furthermore, the computer 3 constitutes control means and is connected via a control line to a Peltier element 5, which is configured for stabilizing the temperature of the fluid F and the air L in particular in the first container 2, but also in containers connected thereto, during the execution of the measuring method.

Furthermore, the measuring device 1 comprises changing means 6 which are provided for compressing and decompressing, respectively, the air L in the first container 2 and by means of which the total volume $V_0$ of the first container 2 is alterable by a predetermined changing volume $\Delta V$. In this exemplary embodiment, the changing means 6 are formed by an actuator 7, a cylinder with the changing volume $\Delta V$ and a piston 8 displaceable in the cylinder by the actuator 7. The computer 3 is connected via a control line to the actuator 7 and controls the position of the piston 8 in the cylinder and thus the volume of the first container 2.

Furthermore, the measuring device 1 comprises a second container 9 which has an upwardly open design, for which reason the fluid F located in the second container 9 is surrounded by air L at the pressure $p_0$ which corresponds to the ambient pressure prevailing during the measurement. Furthermore, the computer 3 comprises also a pressure sensor 10 which measures the current ambient pressure at the housing of the computer 3 before and during the execution of the measuring method.

Furthermore, the measuring device 1 comprises a capillary 11 which connects the first container 2 to the second container 9 at a capillary angle $\alpha=90°$ toward the horizontal, with the measuring device 1 being arranged in the operating position. Through the capillary 11, the fluid F contained in the first container 2 can flow from the first container 2 into the second container 9, while being driven by gravity and/or by a pressure difference $\Delta p=p(t)-p_0$. If the pressure difference is negative and has a larger magnitude than the gravity on the fluid F, the fluid F can also be sucked from the second container 9 into the first container 2. The capillary 11 exhibits a thin flow cross-section $D_K$ through which the fluid F can flow through an opening 12 of the first container 2 across the capillary 11 and an opening 13 of the capillary 11 into the second container 9.

In general, the viscosity of a fluid can be determined by measuring the time which an amount of fluid requires for flowing through a capillary under the influence of a driving force. A distinction is made between the terms kinematic viscosity $\nu$ and dynamic viscosity $\eta$, wherein the driving force for measuring the kinematic viscosity $\nu$ constitutes the dead weight of the fluid to be measured in the earth's gravitational field and wherein the driving force for measuring the dynamic viscosity η is constituted by a pressure difference between the pressures on the fluid at the beginning and at the end of the capillary. The dynamic viscosity η is the actual measure of the viscosity of the fluid. The time period Δt which a particular fluid volume $\Delta V_F$ requires for flowing through a horizontally arranged capillary having a length $L_K$ and a diameter $D_K$ as a result of the pressure difference Δp is associated with the dynamic viscosity η of the fluid F as follows:

Hagen-Poiseuille law:
$$\Delta V_F/\Delta t = \pi * D_K^4 * \Delta p / (128 * L_K * \eta)$$

According to the first exemplary embodiment illustrated in FIG. 1, the second container 9 has an upwardly open design, for which reason the pressure $p_0$ in the second container is always equal to the ambient pressure. The mode of operation of the measuring device 1 according to the first exemplary embodiment is described below on the basis of the measuring method executed by the measuring device 1. In the first process step, the fluid F is introduced into the first container 2 via an opening in the first container 2, which is not illustrated in FIG. 1, whereupon the fluid F to be measured occupies a partial volume $V_{F0}$ of the total volume $V_0$ of the first container 2 and is surrounded by air L at the pressure $p_0$ which corresponds to the ambient pressure prevailing during the measurement.

By means of one of the control elements T of the computer 3, the automated measuring method can be started after the fluid F has been introduced. Thereupon, the computer 3 outputs a control pulse to the actuator 7 in order to displace the piston 8 in the cylinder by a compression stroke. In said second process step of the measuring method, the total volume $V_0$ of the container 2 is reduced by the predetermined changing volume ΔV. According to said second process step of the measuring method, a pressure difference Δp between the pressure p=p (t) in the first container 2 and a pressure $p_0$ of the air L at the outlet opening 13 of the capillary 11 or, respectively, in the second container 9 is thus adjusted at a point in time t. Subsequently, the pressure p caused by the volume change $V_0 - V_{F0} - \Delta V$ is measured in the container 2 with the pressure sensor 4 and is stored in the computer 3.

From that point in time t, the fluid F flows through the capillary 11 depending on the adjusted pressure difference Δp, for which reason the pressure p(t) changes temporally in consequence of the decrease or increase of the fluid F in the first container 2. In a third process step, the decrease in volume $V_F(t)$ of the fluid F per time unit t is determined for the pressure difference Δp(t) which decreases due to the decrease in volume $V_F(t)$ of the fluid F.

The dependence of the volumes and pressures before and after the compression and, respectively, during the escape of the fluid F from the first container 2 over time as result of the pressure difference Δp=p(t)−$p_0$ between the two capillary ends is described by Boyle-Mariotte's law:

$$p_0 * (V_0 - V_{F0}) = p(t) * (V_0 - \Delta V - V_{F0} + V_F(t)).$$

Thereby, the result for the volume of the measuring medium or, respectively, the fluid F is $$V_F(t) = \Delta V - (V_0 - V_{F0}) + (V_0 - V_{F0}) * p_0 / p(t)$$

and the result for the volume flow is $$dV_F/dt = (V_0 - V_{F0}) * p_0 * d(1/p(t))/dt.$$

Therewith, the volume flow $dV_F/dt$ of the measuring medium can be determined from the decay curve of the pressure p(t) as measured.

Figure 2:
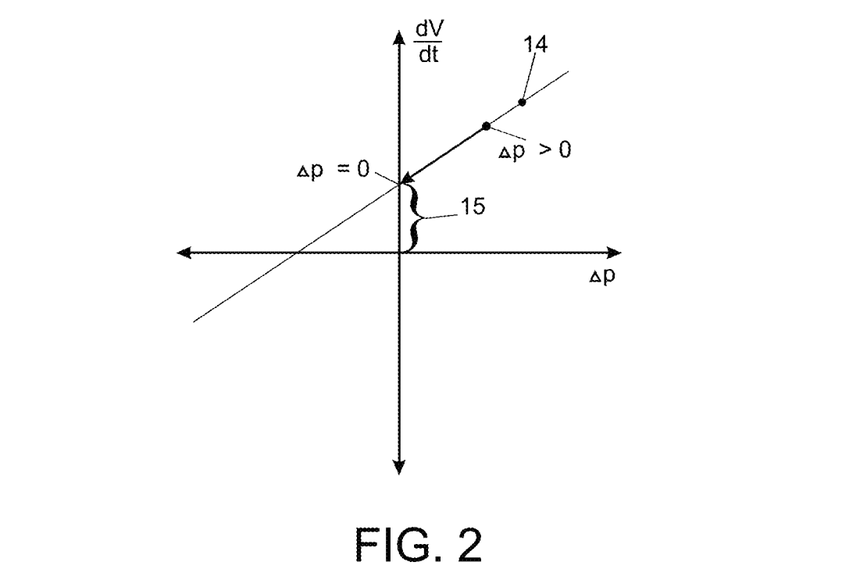
FIG. 2 shows the resulting straight line determined in a first embodiment variant of the measuring method.

According to the first exemplary embodiment of the measuring method, the fluid F flows from the first container 2 into the second container 9, while being driven by the pressure difference Δp(t) and, in addition, by gravity, until the pressures in the container 2 and in the container 9 are at equilibrium, with the hydrostatic pressure $\rho * g * h * \sin(\alpha)$ being taken into account. According to the invention, the volume flow dV/dt which decreases due to the decreasing pressure difference Δp(t) is plotted in a coordinate system as a resulting straight line 14, which is illustrated in FIG. 2. The computer 3 determines and stores the resulting straight line 14 electronically so as to evaluate it—as described below.

In a final process step, the resulting straight line 14 determined from at least two measurement points is used for determining the kinematic viscosity ν and the dynamic viscosity η with the aid of the following formulas $$(dV_F/dt)_1 = K_1 * 1/\eta * \Delta p_1 + K_2 * 1/\nu$$

and $$(dV_F/dt)_2 = K_1 * 1/\eta * \Delta p_2 + K_2 * 1/\nu$$

with the constants $$K_1 = \pi * D_K^4 / (128 * L_K)$$

and $$K_2 = \pi * D_K^4 * g * h * \sin(\alpha) / (128 * L_K)$$

with $L_K$ as the length of the capillary and $D_K$ as the diameter of the capillary 11 and the capillary angle α of the capillary 11 toward the horizontal. Namely, what applies is the correlation that an offset 15 of the resulting straight line 14 toward the zero point of the coordinate system can be evaluated as the kinematic viscosity ν and the slope of the resulting straight line 14 can be evaluated as the dynamic viscosity η by means of the above formulas.

This occurs in such a way that, from $$dV_F/dt = K_1 * 1/\eta * \Delta p + K_2 * 1/\nu \qquad (A)$$

with $K_1$=constant, η=constant, $K_2$=constant, ν=constant $$d(dV_F/dt)/d(\Delta p) = K_1 * 1/\eta \qquad (B)$$

or $$1/\eta = d(dV_F/dt)/d(\Delta p) * 1/K_1, \qquad (C)$$

respectively, is obtained by differentiating the volume flow $dV_F$/dt according to the differential pressure Δp. This means that the reciprocal value of the dynamic viscosity η is proportional to the change in the volume flow $dV_F$/dt with the pressure difference Δp multiplied by the proportionality constant $1/K_1$.

On the other hand, starting with the above equation (A) Δp=0, $$(dV_F/dt)_{\Delta p=0} = K_2 * 1/\nu \qquad (D)$$

or $$1/\nu = (dV_F/dt)_{\Delta p=0} * 1/K_2. \qquad (E)$$

respectively, is obtained. This means that the reciprocal value of the kinematic viscosity ν is proportional to the volume flow $dV_F$/dt at the position Δp=0 multiplied by the proportionality constant $1/K_2$.

As a practical example, with the following measurement results and specifications from the measuring device 1, the following ensues:

$p_0$=970 mbar=97000 Pa $V_0$=2000 μL=2E-6 m$^3$
$V_{F0}$=500 μL=5E-7 m$^3$
$\Delta V$=140 μL=1.4E-7 m$^3$
$D_k$=0.3 mm=0.0003 m
$L_k$=50 mm=0.05 m
h=60 mm=0.06 m
α=90°=1.57 rad As a measuring medium, water at 20° C. was used, which, according to the literature, has the following reference values:

η=1 mPas=0.001 Pas
ρ=1 g/cm$^3$=1000 kg/m$^3$
ν=1 mm$^2$/s=1E-06 m$^2$/s

Therefrom, the computer 3 determines based on Boyle-Mariotte's law:

$$p = p_0 * (V_0 - V_{F0})/(V_0 - V_{F0} - \Delta V) = 1069.85 \text{ mbar} = 106985.29 \text{ Pa}$$

$$\Delta p(t=0) = p - p_0 = 99.85 \text{ mbar} = 9985.29 \text{ Pa}$$

and the constants K1 and K2, which result from the geometry of the measuring device 1:

$$K_1 = \pi * D_k^4/(128 * L_k) = 3.98E\text{-}06 \text{ mm}^3 = 3.98E\text{-}15 \text{ m}^3$$

$$K_2 = \pi * D_k^4 * g * h * \sin(\alpha)/(128 * L_k) = 2.34E\text{-}03 \text{ mm}^5/\text{s}^2 = 2.34E\text{-}15 \text{ m}^5/\text{s}^2$$

After a valve 16 has been opened and the measuring method has begun, the water starts to flow through the capillary 11, whereupon the following measured values are determined by the pressure sensor 4 at the measurement times $t_0$ to $t_{10}$ or, respectively, $t_{10}$ to $t_{30}$. For the measurement times, the values $dV_F/dt$ are calculated from $$dV_F/dt = p_0 * (V_0 - V_{F0}) * d(1/p(t))/dt$$

with $$p(t) = \Delta p(t) - p_0.$$

Figure 3:
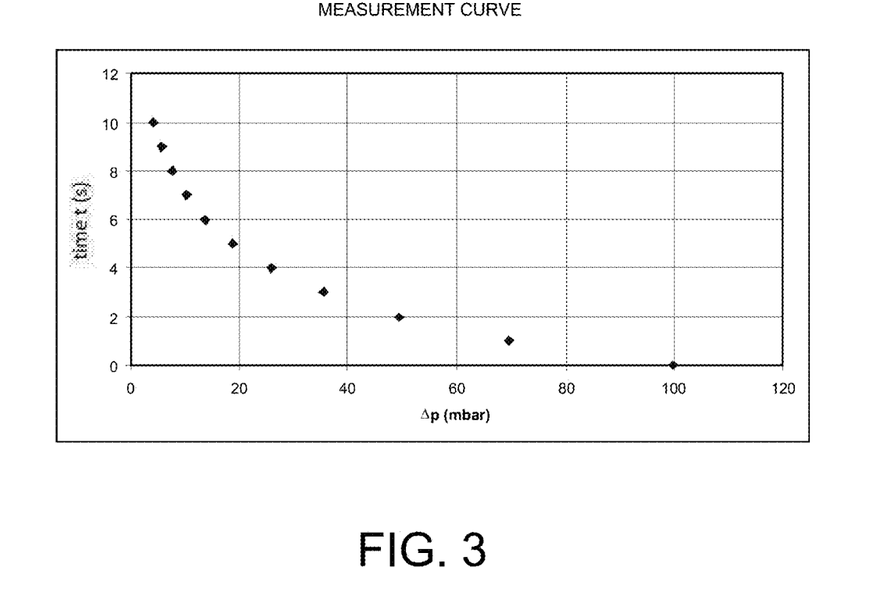
FIG. 3 shows eleven measurement points of a practical measurement for the first embodiment variant of the measuring method.
Figure 4:
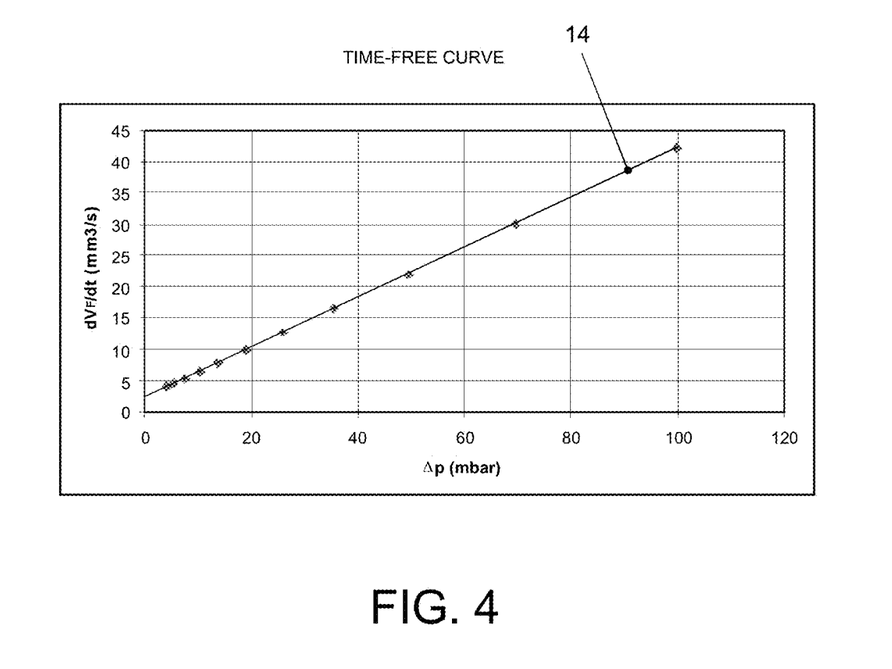
FIG. 4 shows the resulting straight line determined by the measuring device during the practical measurement according to FIG. 3.
Figure 5:
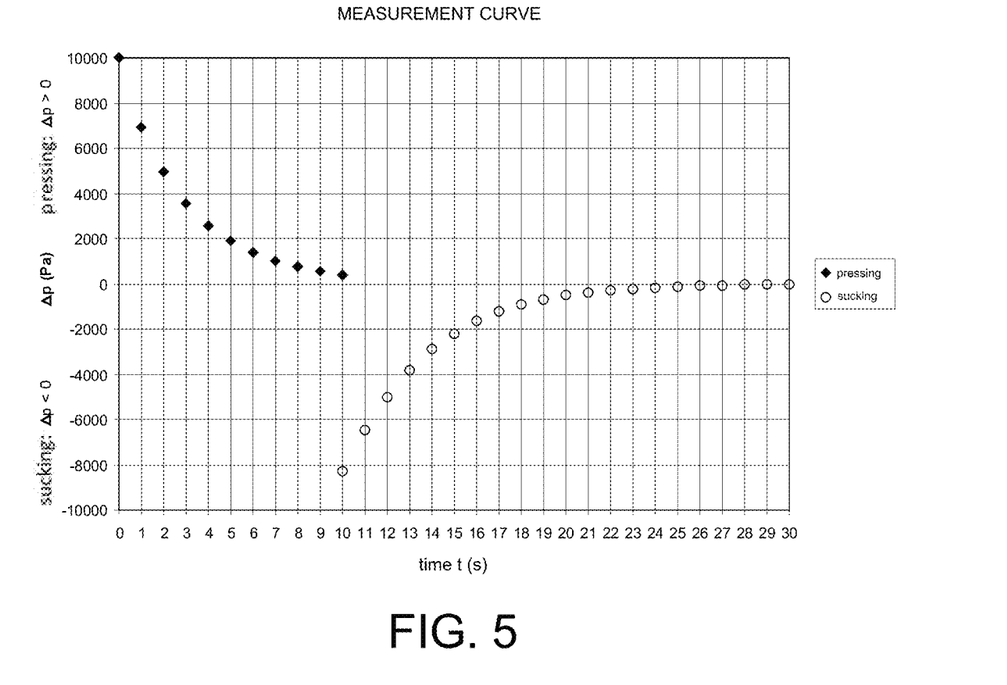
FIG. 5 shows 32 measurement points of a practical measurement for a second embodiment variant of the measuring method.
Figure 6:
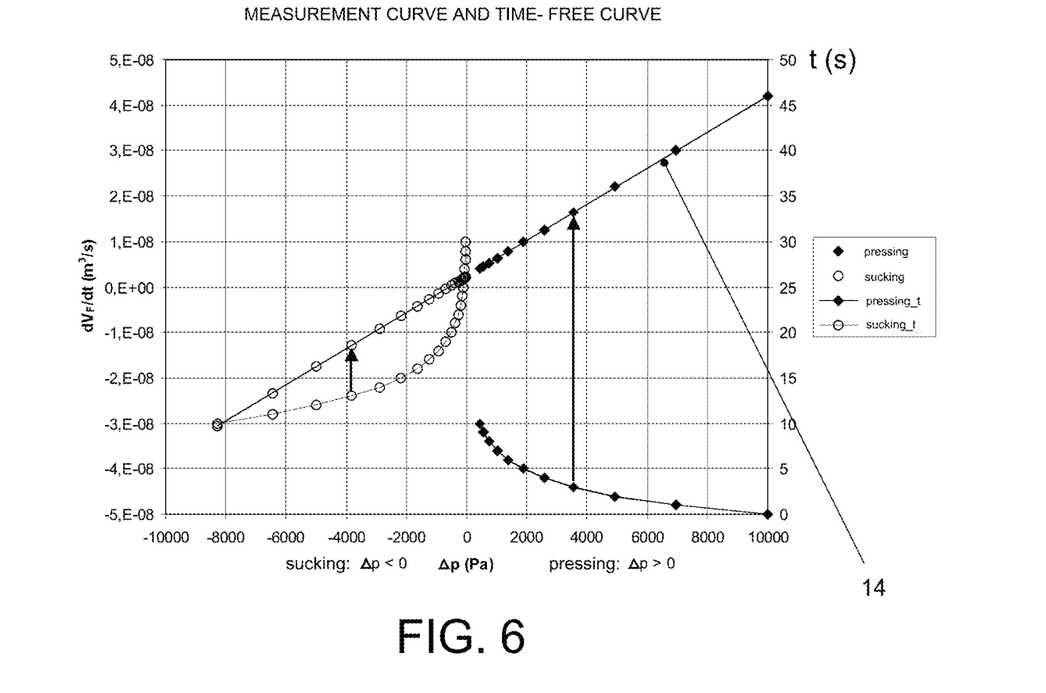
FIG. 6 shows how the resulting straight line is determined from the measurement points according to FIG. 5 by the evaluation device of the measuring device.
Figure 7:
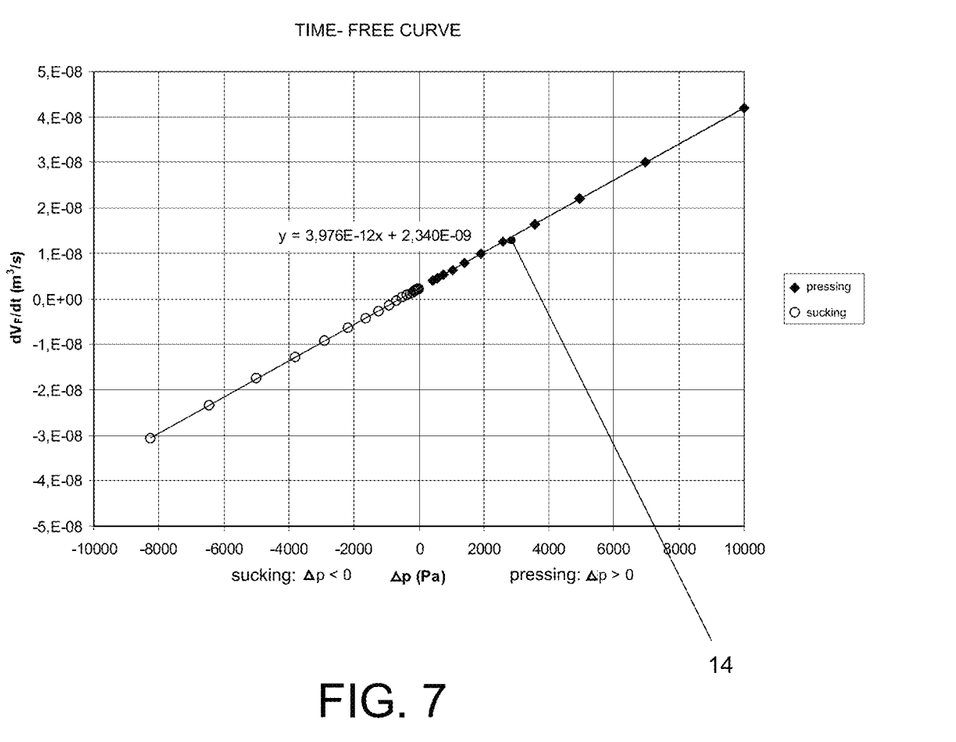
FIG. 7 shows the resulting straight line determined by the measuring device during the practical measurement according FIG. 6.

In FIGS. 3 and 4, measured values and the resulting straight line 14 of the measuring method according to the first exemplary embodiment, which arises therefrom, are illustrated with the "pressing downward" with $\Delta V>0$ (compression) of the fluid F. In FIGS. 5 to 7, measured values and the resulting straight line 14 of the measuring method according to a second exemplary embodiment are illustrated, wherein, upon the "pressing downward" with $\Delta V>0$ (compression), a "sucking upward" with $\Delta V<0$ (decompression) of the fluid F is performed.

Pressing downward: $\Delta V>0$ (compression)

| Time t (s) | Δp (Pa) | $dV_F/dt$ (m$^3$/s) |
|---|---|---|
| 0 | 9985.29 | 4.20E-08 |
| 1 | 6950.68 | 3.00E-08 |
| 2 | 4937.96 | 2.20E-08 |
| 3 | 3554.78 | 1.65E-08 |
| 4 | 2582.06 | 1.26E-08 |
| 5 | 1887.23 | 9.84E-09 |
| 6 | 1385.48 | 7.85E-09 |
| 7 | 1020.36 | 6.40E-09 |
| 8 | 753.18 | 5.34E-09 |
| 9 | 556.90 | 4.55E-09 |
| 10 | 412.28 | 3.98E-09 |

Sucking upward: $\Delta V<0$ (decompression)

| Time t (s) | Δp (Pa) | $dV_F/dt$ (m$^3$/s) |
|---|---|---|
| 10 | -8280.49 | -3.06E-08 |
| 11 | -6462.91 | -2.34E-08 |
| 12 | -4991.70 | -1.75E-08 |
| 13 | -3822.26 | -1.29E-08 |
| 14 | -2906.49 | -9.22E-09 |
| 15 | -2198.00 | -6.40E-09 |
| 16 | -1655.08 | -4.24E-09 |
| 17 | -1242.14 | -2.60E-09 |
| 18 | -929.88 | -1.36E-09 |
| 19 | -694.77 | -4.22E-10 |
| 20 | -518.36 | 2.79E-10 |
| 21 | -386.32 | 8.04E-10 |
| 22 | -287.68 | 1.20E-09 |
| 23 | -214.09 | 1.49E-09 |
| 24 | -159.26 | 1.71E-09 |
| 25 | -118.43 | 1.87E-09 |
| 26 | -88.04 | 1.99E-09 |
| 27 | -65.44 | 2.08E-09 |
| 28 | -48.63 | 2.15E-09 |
| 29 | -36.14 | 2.20E-09 |
| 30 | -26.85 | 2.23E-09 |

FIG. 5 shows the decrease in the pressure difference Δp(t) at the eleven measurement times $t_0$ to $t_{10}$ and the increase in the pressure difference Δp(t) at the 21 measurement times $t_{10}$ to $t_{30}$ for the combined measuring method for "pressing downward" and "sucking upward". FIG. 6 shows for individual ones of the 32 measured values in the combined measuring method according to the second exemplary embodiment how the individual allocated points of the resulting straight line 14 are calculated from the measured values by the evaluation device of the computer 3, using the above formulas. FIG. 7 shows the resulting straight line 14 determined according to FIG. 6 in an illustration comparable to FIG. 4. The values resulting therefrom for the fluid F water are as follows:

$$\eta = 1/(1/\eta) = 1/(d(dV_F/dt)/d(\Delta p) * 1/K_1) = 1/(3.976E\text{-}12 * 1/3.98E\text{-}15) = 0.001 \text{ Pas} \quad \text{dynamic viscosity}$$

$$\nu = 1/(1/\nu) = 1/((dV_F/dt)_{\Delta p=0} * 1/K_2) = 1/(2.340E\text{-}09 * 1/2.34E\text{-}15) = 1E\text{-}6 \text{ m}^2/\text{s}. \quad \text{kinematic viscosity}$$

In practice, the constants $K_1$ and $K_2$ are not obtained from the geometric details of a measuring device as in the above example, since, for example, even a measurement with sufficient accuracy of a capillary diameter $D_K$ of 0.5 mm would not be possible with justifiable effort. Therefore, the constants are obtained by an alignment measurement with a reference measuring medium in that the formulas for calculating the dynamic viscosity (C) and the kinematic viscosity (E) are transformed for the calculation of $K_1$ and $K_2$, respectively:

$$1/K_1 = d(dV_F/dt)/d(\Delta p) * 1/\eta, \quad (C')$$

and, respectively, $$1/K_2 = (dV_F/dt)_{\Delta p=0} * 1/\nu. \quad (E')$$

Since the values of the dynamic viscosity η and the kinematic viscosity ν of the reference measuring medium are known very well, the values for $K_1$ and $K_2$ can be calculated by evaluating the resulting straight line.

The following advantages are obtained by the measuring method according to the invention and the measuring device:

1. The kinematic viscosity and the dynamic viscosity can be determined simultaneously with one capillary with only one single measurement.

2. The measuring method with a Δp changing over time (as a result of the changing internal pressure) is applicable for the simultaneous determination of the dynamic viscosity and the kinematic viscosity, with the additional advantage that the accuracy is substantially increased by evaluating the linear equation with modern algorithms over, for example, a linear regression.

3. An estimation of the quality of each individual measurement separately is possible by comparing the measured curve to an exact straight line, which is placed through the measurement points. The closer to the resulting straight line 14 the points are located, the better will be the quality of the measurement. Filling errors such as, e.g., air bubbles in the measuring medium are also identifiable in this way. Otherwise, an adequate estimation would only be possible by a comparison to a second measurement of the same measuring medium.

4. For precisely determining the dynamic viscosity, the capillary does not have to be located exactly horizontally as in the measuring method according to patent AT 508 276 B1, since the time for the outflow is no longer determined, which would change in a capillary not located horizontally due to the gravity additionally acting on the measuring medium, but the dynamic viscosity results from the slope of the straight line, which is independent of the angle of the capillary toward the horizontal.

5. Measurements with at least two arbitrary pressures Δp, which are kept constant, would also be possible by constructing a resulting straight line from the at least two measurement points.

6. For increasing the measuring accuracy, several measurements of the same measuring medium carried out consecutively can be evaluated jointly via the linear equation in order to further increase the accuracy of the measurement.

According to a further exemplary embodiment not illustrated in the figures, a measuring device comprises pressure determination means in order to keep a first pressure $p_1$ in the first container constant also with a fluid escaping through the capillary. Consequently, the first pressure $p_1$ is determined by the computer and remains constant in the first container during the execution of the measuring method. Subsequently, a second measurement is performed at a second pressure $p_2$, which is kept constant in the first container, in order to be able to determine the resulting straight line with those two measured values. Also, according to this exemplary embodiment of the measuring method, the kinematic viscosity ν and the dynamic viscosity η of the fluid F can be determined by the computer 3 during the execution of the measuring method in the measuring device 1 by evaluating the resulting straight line.

According to said further exemplary embodiment, the second container furthermore comprises fluid-level measuring means, which are formed by two NTC-resistances and evaluation means in the computer. The NTC-resistances are heated up electrically and are subjected to cooling via the fluid brushing along the inside of the second container, whereby the NTC-resistances cool down differently, depending on whether fluid or air brushes along the inside of the second container. In this way, the computer is able to measure the outflow of a certain amount of fluid $\Delta V_F$ from the first container into the second container, which is necessary only for the measurements at the first pressure $p_1$, which is kept constant, or, respectively, at the second pressure $p_2$, which is kept constant.

According to a further exemplary embodiment, a second measuring device not illustrated in the figures exhibits a closed second container instead of the upwardly open container 9, wherein the pressure in the second container changes by the inflowing or outflowing fluid F, the change being measured by a pressure sensor.

The second measuring device with the closed containers has the advantage that air pressure fluctuations concerning the ambient pressure $p_0$ in the space or in the free area where the measuring device is located cannot interfere with the measurement. This advantage becomes important especially for highly precise measurements or in harsh environments. In this connection, it is particularly beneficial to use a differential pressure sensor for measuring the pressure difference between the pressure in the first container and the pressure in the second container.

It may be mentioned that the resulting straight line can be determined with the most diverse variants of pressure differences between the first container and the outlet opening of the capillaries. For determining the resulting straight line, at least two measurement points must be established, wherein the assessment of the quality of the resulting straight line will be the better, the more measurement points are established.

According to a further exemplary embodiment of the invention, the capillary has a capillary angle α of 45 or 60 degrees. Since, in the previous formulas for determining the dynamic and kinematic viscosities, the capillary angle is advantageously measured from the resulting straight line and is considered in the calculation, precise and correct values arise for the dynamic and kinematic viscosities of the measuring medium also in those measurements with measuring devices.

The invention claimed is:

1. A measuring method for measuring the viscosity of an essentially non-compressible measuring medium (F) with a measuring device (1) comprising a first container (2), wherein the measuring medium (F) can leak from the first container (2) via a capillary (11) which, in an operating position, is arranged at a certain capillary angle (α) toward the horizontal, preferably perpendicularly, via an outlet opening (13) of the capillary (11), and wherein, in a first process step, the measuring medium (F) is introduced into the first container (2) filled with a compressible medium (L), in particular ambient air, whereupon the measuring medium (F) occupies a partial volume ($V_{F0}$) of the total volume ($V_0$) of the first container (2), and wherein, in a second process step, a pressure difference (Δp; Δp(t)) between a pressure (p; p(t)) of the compressible medium (L) in the first container (2) and a pressure ($p_0$) of the compressible medium (L) at the outlet opening (13) of the capillary (11) is adjusted, and wherein, in a third process step, the decrease in volume ($dV_F(t)/dt$) of the measuring medium (F) per time unit is determined for the pressure difference (Δp) which is kept constant or for a pressure difference (Δp(t)) which decreases as a result of the decrease in volume ($dV_F(t)/dt$) of the measuring medium (F) in order to determine at least two measurement points of the decrease in volume ($dV_F(t)/dt$) of the measuring medium (F) per time unit over the pressure difference (Δp) as a resulting straight line (14) in a coordinate system, and wherein, in a final process step, the kinematic viscosity (ν) is determined from the value (15) of the resulting straight line (14) for the decrease in volume ($dV_F(t)/dt$) of the measuring medium (F) per time unit at the pressure difference of Δp=0 and the dynamic viscosity (η) of the measuring medium (F) is determined from the slope of the resulting straight line (14).

2. A measuring method according to claim 1, wherein the decrease in volume ($dV_F(t)/dt$) of the measuring medium (F) per time unit is determined for a pressure difference ($\Delta p(t)$) which decreases as a result of the decrease in volume ($dV_F(t)/dt$) of the measuring medium (F) from the pressure difference decreasing over time, which has been measured, by means of the following formula:

$$dV_F(t)/dt = (V_0 - V_{F0}) * p_0 * d(1/p(t))/dt,$$

wherein $p(t)$ $$\Delta p(t) = p(t) - p_0$$

applies, and therefrom, from any number of measurement points, the following resulting straight line (14) is established:

$$(dV_F/dt) = K_1 * 1/\eta * \Delta p + K_2 * 1/\nu$$

with the constants $$K_1 = \pi * D_K^4 / (128 * L_K)$$

and $$K_2 = \pi * D_K^4 * (g*h) * \sin(\alpha) / (128 * L_K)$$

with $L_K$ as the length of the capillary (11) and $D_K$ as the diameter of the capillary (11) and the capillary angle ($\alpha$) of the capillary (11) toward the horizontal, in order to determine therefrom, in the final process step, the kinematic viscosity ($\nu$) and the dynamic viscosity ($\eta$) of the measuring medium (F).

3. A measuring method according to claim 1, wherein, at a first pressure difference ($\Delta p_1$) kept constant in the third process step, a first measurement time is determined for determining the first measurement point, during which time the entire measuring medium (F) or a measured part thereof leaks from the first container (2) from the capillary (11), and that, in the third process step for determining the second measurement point, a second pressure difference ($\Delta p_2$) different from the first pressure difference ($\Delta p_1$) is adjusted between the pressure (p) of the compressible medium (L) in the first container (2) and the pressure ($p_0$) of the compressible medium (L) at the outlet opening (13) of the capillaries (11) or in an open second container (9) provided at the outlet opening (13) of the capillaries (11) and is kept constant during a second measurement time period, and a second measurement time is determined during which the entire measuring medium (F) or a measured part thereof flows through the capillary (11) into the second container (9), wherein, from those two measurement points of the decrease in volume ($(dV_F(t)/dt)_1$) at the first pressure difference ($\Delta p_1$) and, respectively, of the decrease in volume ($(dV_F(t)/dt)_2$) at the second pressure difference ($\Delta p_2$) with $$(dV_F/dt)_1 = K_1 * 1/\eta * \Delta p_1 + K_2 * 1/\nu$$

and $$(dV_F/dt)_2 = K_1 * 1/\eta * \Delta p_2 + K_2 * 1/\nu$$

with the constants $$K_1 = \pi * D_K^4 / (128 * L_K)$$

and $$K_2 = \pi * D_K^4 * (g*h) * \sin(\alpha) / (128 * L_K)$$

with $L_K$ as the length of the capillary (11) and $D_K$ as the diameter of the capillary (11) and the capillary angle ($\alpha$) of the capillary (11) toward the horizontal, a resulting straight line (14) is determined in order to determine the kinematic viscosity ($\nu$) and the dynamic viscosity ($\eta$) of the measuring medium (F) therefrom in the final process step.

* * * * *